US006419738B1

United States Patent
Classen et al.

(10) Patent No.: US 6,419,738 B1
(45) Date of Patent: Jul. 16, 2002

(54) PROCESS FOR RENDERING WASTE INERT BY CLADDING IN A HYDRAULIC BINDER AND PRE-MIX FOR PRACTICING THIS PROCESS

(75) Inventors: Bruno Classen, Mareil sur Mauldre; Bruno Le Rolland, Oinville sur Montcient; Pierre Colombet, Longnes, all of (FR)

(73) Assignee: Ciments Francais, Puteaux (FR)

( * ) Notice: Subject to any disclaimer, the term of this patent is extended or adjusted under 35 U.S.C. 154(b) by 0 days.

(21) Appl. No.: 09/629,698

(22) Filed: Jul. 31, 2000

(30) Foreign Application Priority Data

Jul. 30, 1999 (FR) .............................. 99.09922

(51) Int. Cl.$^7$ .............................................. C04B 28/06
(52) U.S. Cl. ............... 106/692; 106/697; 423/DIG. 18; 588/257
(58) Field of Search ................. 106/692, 697; 423/DIG. 18; 588/3, 4, 7, 13, 257

(56) References Cited

U.S. PATENT DOCUMENTS

| 5,234,498 A | * | 8/1993 | Graves, Jr. .................. 106/733 |
| 5,494,513 A | | 2/1996 | Fu et al. |
| 5,624,489 A | * | 4/1997 | Fu et al. ..................... 106/692 |
| 5,976,244 A | * | 11/1999 | Mallow ...................... 106/813 |

FOREIGN PATENT DOCUMENTS

| CN | 1128244 | * | 8/1996 |
| EP | 0 838 443 A1 | | 4/1998 |
| EP | 0 900 771 A1 | | 10/1999 |
| WO | WO 98/49115 | | 11/1998 |

OTHER PUBLICATIONS

Kokai Tokkyo Koho, "Calcium Sulfoaluminate–Based Inorganic Hardened Materials With Improved Fire Resistance", Matsushi Electric Works, Ltd., vol. 93, No. 24, p. 263 (No Date Available).

Kokai Tokkyo Koho, "Concrete Articles with Hight Strength and Weathering Resistance", Chichibu Cement Co., Ltd., vol. 104, No. 8, p. 291 (No Date Available).

* cited by examiner

*Primary Examiner*—Paul Marcantoni
(74) *Attorney, Agent, or Firm*—Young & Thompson

(57) ABSTRACT

Waste is rendered inert, by cladding the waste in a cement base hydraulic binder including sulfoaluminate cement comprised by at least 30% by weight of the phase $3CaO.3Al_2O_3.CaSO_4(C_4A_3\bar{S})$. The hydraulic binder can be either essentially constituted by sulfoaluminate cement, or instead comprise one or several zeolites. A pre-mix is provided for practicing the process, containing at least one zeolite and at least 15% of sulfoaluminate cement, comprised of at least 30% of the phase $3CaO.3Al_2O_3.CaSO_4$ $(C_4A_3\bar{S})$. This pre-mix is preferably used for cladding residues of the incineration of household waste.

8 Claims, 1 Drawing Sheet

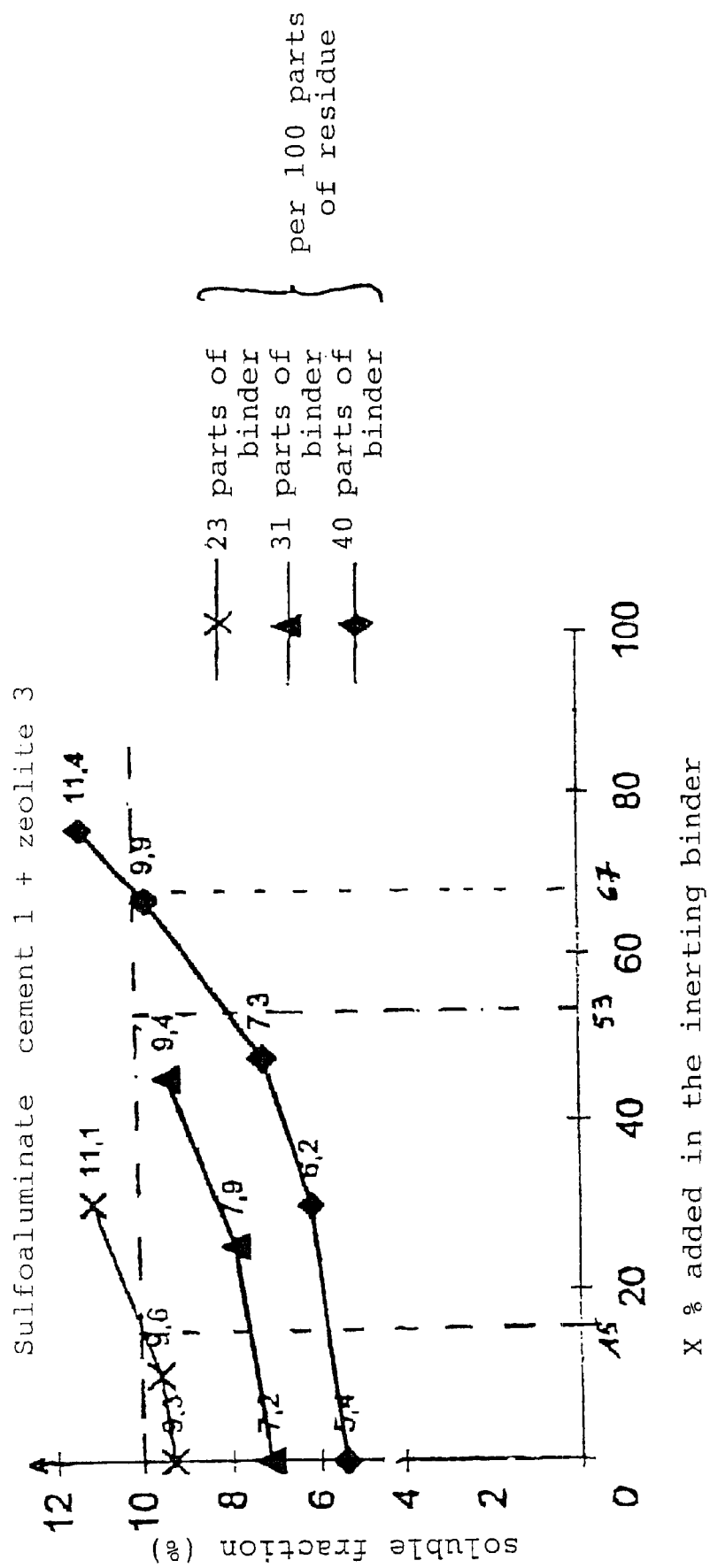

PROCESS FOR RENDERING WASTE INERT BY CLADDING IN A HYDRAULIC BINDER AND PRE-MIX FOR PRACTICING THIS PROCESS

FIELD OF THE INVENTION

The present invention has for its object a process to stabilize and solidify wastes such as for example cinders, residues from incineration of household garbage and industrial wastes. The invention also relates to the pre-mix used to practice this process.

BACKGROUND OF THE INVENTION

Beginning in 2002, legislation will prevent the discharge of such wastes. These latter will be placed in storage sites after having been subjected to a stabilization process. This process consists in conferring on the product obtained, certain characteristics bearing on its leachable fraction and its mechanical strength. The leachable fraction is measured by means of standard leaching tests (X31-210 and X31-211). They permit measuring the quantities of pollutants that are salted out, as well as the soluble fraction. This change in legislation is for purposes of protecting the environment. Thus, these wastes contain numerous organic and mineral pollutants. In the absence of stabilization treatment the phenomena such as erosion by groundwater or rainwater, as well as the action of wind, risks giving rise to pollution of the soil and the phreatic layers.

There already exist numerous processes for stabilizing wastes. These are divided into three large groups:

vitrification processes: these are thermal processes which consist in totally melting the waste and any possible additives, then cooling them abruptly so as to obtain a solid having a vitreous appearance. This technique permits obtaining a material with an excellent chemical strength, but the direct thermal treatment of the waste is accompanied with the emission of chlorine, sulfur oxides or volatile heavy metals such as mercury, cadmium, and lead, injurious to the environment.

cladding processes with an organic binder (for example bitumen). These consist in mixing hot binder and waste, molding the obtained mixture in the desired shape, and letting it cool. The product obtained is heterogeneous when the waste is incorporated in the form of a granulate and relatively homogeneous when the waste is pulverized. In these two cases, there is no chemical reaction between the waste and the binder. As a result, when the product melts, for example under the influence of sunshine, the toxic elements are freed and can thus give rise to pollution. Moreover, the regulations concerning the admission of inert waste to storage sites are more and more severe as to their organic material content, which greatly limits the use of this type of process.

Solidification/stabilization processes with a hydraulic binder. These consist in mixing the waste with suitable binder or binders, if desired additives (fluidizer, filler . . . ) and water. The obtained slurry is then disposed on the storage site or molded in the form of blocks. The binders used are generally cements with certain additives which in contact with water react with each other or with constituents of the waste to form almost insoluble phases. These processes have several advantages. On the one hand, they give the solidified product a good mechanical strength and low porosity, which limits its contact surface with groundwaters. On the other hand, the phases of low solubility that form in the course of hydration, such as hydrated calcium silicates and hydrated calcium aluminates, affix a large number of pollutants, which limits the emission of harmful elements.

These latter are distinguished by the composition of the hydraulic binders used. They can be classified in three categories:

a) processes using hydraulic binders whose composition does not include cement. By way of example, U.S. Pat. No. 5,494,513 uses up to five constituents (a zeolite, lime, hemihydrate, sodium sulfate and aluminum sulfate); U.S. Pat. No. 5,484,533 uses six constituents: zeolite, quartz, aluminum hydroxide, sodium carbonate or sodium hydroxide, dolomite lime and finally potassium hydroxide or carbonate. The high number of these components therefore considerably complicates the composition of the inert binder. Moreover, the last-mentioned comprises a curing step between 80 and 120° C. which is both costly and dangerous, because it liberates lower hydrocarbons which can be present in the waste.

b) processes using hydraulic binders comprising a portion of cement and one or several additives permitting on the one hand using less cement and on the other hand promoting the fixation of the pollutants. Thus, JP 10-225669 uses a composition comprising cement and fly ash; EP 547923 uses a binder comprising cement and slag; FR 2758749 uses any cement to which is added a compound containing nitrate or nitrite ions so as to decrease swelling. This latter is dangerous because in the case of poor fixation of the nitrates in the course of hydration, the nitrate ions will be immediately released by the solidified product, the nitrated phases being generally highly soluble in water.

c) these processes use hydraulic binders comprising only cement. These are very effective but require a preliminary analysis of the waste to be stabilized so as to optimize the composition and the quantity of the cement to be used. Thus, EP 588689 foresees an elementary analysis of the wastes so as at least to know the calcium and soluble salt content. The composition of the inerting cement (in this instance an alumina cement) thus depends on this preliminary analysis. As a result, a change in the composition of the waste gives rise to a change in the composition of the cement to be used. This process therefore is complicated when the composition of the waste varies, which, according to its origin, is often the case.

SUMMARY OF THE INVENTION

An object of the present invention is therefore to provide a simple process, not involving excessive cost of application.

Another object is to provide a process which can be adapted to very numerous types of waste.

Moreover, the stabilized waste must also meet, in France, the criteria of acceptance at a storage site defined by the Official Journal of the French Republic (effective Feb. 18, 1994), whose mechanical criteria are less stringent (mechanical strength as low as 1 MPa being considered sufficient), but whose criteria as to the soluble fraction (10%) are more difficult to observe by present processes, at an acceptable economical level.

Another object of the present invention is therefore to provide a process which, by "neutralizing" the waste, permits obtaining a solid product having a low soluble fraction, which is to say less than 10% (according to the above standard).

These objects are achieved by a process of rendering waste inert, according to the invention, which belongs to the category of processes of cladding the waste in a cement-based hydraulic binder, the process being characterized by the fact that the inerting hydraulic binder comprises sulfoaluminate cement comprised by at least 30% by weight of the phase $3CaO.3Al_2O_3.CaSO_4(C_4A_3\bar{S})$.

It has been discovered in a surprising manner that the use of cements containing a high proportion ($\geq 30\%$) of the calcium sulfoaluminate phase (CSA), for rendering waste inert, permits obtaining a soluble fraction less than that obtained with other cements, such as for example aluminous cement or Portland cement. An explanation could be that during hydration of the CSA phase, which reacts with water to form hydrated phases such as ettringite and calcium monothioaluminate, also reacts with metallic cations and soluble anions present in the waste by cladding them in their crystalline matrix. This mode of chemical securement and the low solubility of the hydrates results in an excellent retention of the soluble pollutants.

According to a first modification of the invention, the hydraulic binder is constituted essentially of said sulfoaluminate cement, the binder being preferably used in proportions comprised between 15 and 150 parts by weight, preferably between about 25 and 100 parts per weight per 100 parts of waste, for example incineration residues of household waste.

According to a second modification of the invention, the hydraulic binder comprises said sulfoaluminate cement and a filler based on, or made of one or several zeolites.

This zeolite can be of natural or synthetic origin and can comprise variable proportions of silica and alumina, the principal constituents of zeolites. Preferably, the zeolite is in pulverulent form, of a granulometry near that of cement, which is to say preferably lower than about 100 $\mu$m.

Zeolite permits also limiting the release of metallic cations when the hardened product is subjected to erosion by water.

The proportion of zeolite relative to the waste is preferably less than 120 parts by weight, preferably 100 parts by weight, per 100 parts of waste, and the hydraulic binder contains preferably at least about 13 parts of said sulfoaluminate cement per 100 parts of waste.

The present invention also has for its object the pre-mix for practicing the process described above, the pre-mix being characterized in that it contains at least 15% of sulfoaluminate cement comprised by at least 30% of the phase $3CaO.3Al_2O_3.CaSO_4(C_4A_3S)$.

This pre-mix preferably contains, according to the second modification of the invention, also one or several zeolites.

The present invention also relates to the use of said inerting process to clad waste of different categories, such as specialized industrial wastes: incineration wastes, metallurgical wastes, etc . . . It is particularly suitable for the stabilization and solidification of incineration residues of household wastes, by permitting limiting the soluble fraction after leaching to contents less than 10%, or even less than 6% in certain cases, without increasing the cost of inerting.

BRIEF DESCRIPTION OF THE DRAWING

FIG. 1 shows graphs representing the soluble fraction (percent) as a function of percentage of additive in the inerting binder.

DETAILED DESCRIPTION OF THE INVENTION

The present invention will now be illustrated by examples of its practice, which are non-limiting.

In these examples there have been used wastes from among the most "toxic", which is to say wastes in the form of powders and of which a portion can dissolve in water, and in particular residues of purification of smoke from the incineration of household waste, whose soluble fraction is very high.

In the following examples, the waste to be stabilized is as described above, of which the soluble fraction is equal to 48%.

Example 1 this example relates to a process of inerting with a hydraulic binder constituted solely of cement (sulfoaluminate cement) according to the first modification of the invention, and other cements by way of comparison.

Test samples containing 100 parts of the mentioned residue from purification of smoke, 40 parts of cement and 57.5 parts of water were mixed together. The different cements used were Portland cement, aluminous cement, a composition containing 80% Portland and 20% aluminous cement, and three different sulfoaluminate cements whose characteristics are described in Table 1. A leaching test according to the standard X31-211 was carried out on each of the samples thus constituted. The leaching test is different from the standard X31-211 in that the dwell in the leaching water was one time for 24 hours instead of three times for 16 hours interspersed by a rest periods of eight hours.

TABLE 1

Composition of sulfoaluminate cements

| | Sulfoaluminate cement 1 | Sulfoaluminate cement 2 | Sulfoaluminate cement 3 |
|---|---|---|---|
| Elemental composition (X fluorescence) | CaO: 38%<br>$Al_2O_3$: 47.4%<br>$SO_3$: 7.5%<br>$SiO_2$: 3.6%<br>$Fe_2O_3$: 1.4%<br>$TiO_2$: 2.2%<br>MgO: 0.3%<br>$K_2O$: 0.2%<br>$Na_2O$: 0.1% | CaO: 44.9%<br>$Al_2O_3$: 28.2%<br>$SO_3$: 7.3%<br>$SiO_2$: 7.7%<br>$Fe_2O_3$: 7.4%<br>$TiO_2$: 2.3%<br>MgO: 0.7%<br>$K_2O$: 0.2%<br>$Na_2O$: 0% | CaO: 42.4%<br>$Al_2O_3$: 34.2%<br>$SO_3$: 8.5%<br>$SiO_2$: 7.6%<br>$Fe_2O_3$: 3.03%<br>$TiO_2$: 1.5%<br>MgO: 2.1%<br>$K_2O$: 0.3%<br>$Na_2O$: 0.1% |
| Minerologic composition | $C_4A_3\bar{S}$: 56%<br>$C_4AF$: 3%<br>$C_2AS$: 17%<br>CA: 17% | $C_4A_3\bar{S}$: 45%<br>$C_2S$: 3%<br>$C_4AF$: 20%<br>$C\bar{S}$: 3% | $C_4A_3\bar{S}$: 60%<br>$C_2S$: 18%<br>$C_4AF$: 10%<br>$C\bar{S}$: 1.6% | wherein:

$C_4A_3\bar{S}$ is $4CaO, 3Al_2O_3, SO_3$ $C_4AF$ is $4CaO, Al_2O_3, Fe_2O_3$ $C_2AS$ is $2CaO, Al_2O_3, SiO_2$ CA is $CaO, Al_2O_3$ $C_2S$ is $2CaO, SiO_2$ $C\bar{S}$ is $CaO, SO_3=CaSO_4$.

The results of the leaching test concerning the soluble fractions are the following (Table 2):

TABLE 2

Result of leaching tests

| Type of cement | Portland | Aluminous | Portland + Aluminous | Cement 1 | Cement 2 | Cement 3 |
|---|---|---|---|---|---|---|
| Soluble fraction | 10.2% | 6.5% | 8.4% | 5.4% | 4.1% | 5.5% |

Table 2 clearly shows that the soluble fraction is lowered by at least 1 point relative to other cements when one of the sulfoaluminate cements is used as the binder for rendering the waste inert.

Complementary experiments have shown that the same phenomenon was observed for contents of cements introduced into the mixture comprising between 30 and 100 parts per 100 parts of the same waste.

EXAMPLE 2

A portion of the sulfoaluminate cement introduced as before, into the mixture, was substituted with different additives so as to decrease the quantity of cement used for inerting. These additives (introduced separately) were fly ash, slag and three different zeolites whose composition is given in the following Table 3.

TABLE 3

Principal constituents of the zeolites

|  | Zeolite 1 | Zeolite 2 | Zeolite 3 |
|---|---|---|---|
| Loss upon firing | 1.2 | 9.3 | 0 |
| $SiO_2$ | 48.2 | 66.8 | 49 |
| $Al_2O_3$ | 42.5 | 13.2 | 18 |
| $Fe_2O_3$ | 0.6 | 1.4 | 4 |
| $TiO_2$ | 1.6 | 0.2 | 1 |
| CaO | 0.2 | 3.6 | 7 |
| MgO | 0 | 1.1 | 1 |

These zeolites have a specific surface at least of the order of 1500 $cm_2/g$.

Per 100 parts of the above residue, 40 parts of inerting binder (cement+additive) were introduced with 57.5 parts of water. The inerting hydraulic binder is constituted by a variable content of additives comprised between 0 and 75%, the balance to 100% being constituted by sulfoaluminate cement 2. The soluble fraction of the specimens thus constituted was measured according to the same protocol as that described in Example 1 (Table 4).

TABLE 4

Results of measurements of the soluble fraction (in percentage)

| Content of additive in the inerting binder | Fly ash | Slag | Zeolite 1 | Zeolite 2 | Zeolite 3 |
|---|---|---|---|---|---|
| 30% | 7 | 6.7 | 5.4 | 6 | 5.8 |
| 50% | 8.8 | 8.5 | 6.4 | 7.8 | 7.5 |
| 67% | 13.8 | 12.8 | 8.1 | 9.9 | 9.7 |
| 75% | 16.2 | 15.4 | 9 | 11.9 | 11.2 |

This soluble fraction remains low when a zeolite is used, in comparison to the values measured for the same contents of fly ash and slag in the hydraulic binder.

This soluble fraction does not exceed 10% for the three zeolites, up to contents approaching 67% in the hydraulic binder.

It will also be noted that zeolite 1, which has an $Al_2O_3/SiO_2$ ratio greater than zeolites 2 and 3, has a better effectiveness.

EXAMPLE 3

Various quantities of hydraulic binder constituted by variable proportions of sulfoaluminate cement 1 and zeolite 3 were used to clad the same residue as in Examples 1 and 2, namely 23, 31 and 40 parts of binder per 100 parts of residue, in the presence of respectively 50.6, 53.8 and 57.5 parts of water.

The measurements of the soluble fraction were carried out as before, and the results obtained are shown in FIG. 1 in the form of graphs representing the soluble fraction (percent) as a function of the percentage of additive in the inert binder. In these graphs, it will be noted that to remain within the limit of 10% of soluble fraction, there should be used about 15, 53 and 67% of filler constituted by zeolite 3, for respectively 23, 31 and 40 parts of binder.

The proportion of sulfoaluminate cement 1 for these different limits is thus about 15 parts for 100 parts of the residue.

TABLE 5

| Parts of residue | Parts of binder | Composition of the binder Added parts | Composition of the binder Cement parts | % minimum additive to remain within 10% of soluble fraction |
|---|---|---|---|---|
| 100 | 23 | 4 | 19 | 15 |
| 100 | 31 | 16 | 15 | 53 |
| 100 | 40 | 27 | 13 | 67 |

We claim:

1. A process for rendering waste inert, the process comprising cladding the waste in a hydraulic binder comprising sulfoaluminate cement comprising at least 30% by weight of the phase $3CaO.3Al_2O_3.CaSO_4$.

2. The process according to claim 1, wherein the hydraulic binder consists essentially of the sulfoaluminate cement.

3. The process according to claim 2, wherein the amount of the sulfoaluminate cement consists of between 15 and 150 parts by weight per 100 parts of waste.

4. The process according to claim 3, wherein the amount of the sulfoaluminate cement consists of between 25 and 100 parts by weight per 100 parts of waste.

5. The process according to claim 1, wherein the hydraulic binder comprises the sulfoaluminate cement and at least one zeolite.

6. The process according to claim 5, wherein the amount of the zeolite is such that the hydraulic binder contains at least about 13 parts of the sulfoaluminate cement per 100 parts of waste.

7. The process according to claim 1, wherein the waste comprises incinerated household waste.

8. A pre-mix for rendering waste inert, the pre-mix comprising at least one zeolite and at least 15% by weight of sulfoaluminate cement, comprised of at least 30% of the phase $3CaO.3Al_2O_3.CaSO_4$.

* * * * *